(12) United States Patent
Kamenoue et al.

(10) Patent No.: US 9,776,582 B2
(45) Date of Patent: Oct. 3, 2017

(54) WIRING STRUCTURE OF DOOR HARNESS

(71) Applicant: YAZAKI CORPORATION, Tokyo (JP)

(72) Inventors: Masayoshi Kamenoue, Hiroshima (JP); Hiroomi Nakata, Hiroshima (JP); Akihiko Kaneko, Hiroshima (JP); Norimasa Yabase, Hiroshima (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/383,630

(22) Filed: Dec. 19, 2016

(65) Prior Publication Data

US 2017/0174154 A1  Jun. 22, 2017

(30) Foreign Application Priority Data

Dec. 22, 2015 (JP) ................................ 2015-249231

(51) Int. Cl.
*B60R 16/02* (2006.01)
*H01B 7/00* (2006.01)
*H02G 3/38* (2006.01)

(52) U.S. Cl.
CPC ....... *B60R 16/0222* (2013.01); *H01B 7/0045* (2013.01); *H02G 3/38* (2013.01)

(58) Field of Classification Search
CPC .... B60R 16/0222; H01L 37/0045; H02G 3/38
See application file for complete search history.

(56) References Cited

U.S. PATENT DOCUMENTS 6,354,651 B1 * 3/2002 Mori ................... B60R 16/0222
                                                    174/152 G
2005/0047859 A1 * 3/2005 Santanda ............ B60R 16/0222
                                                        403/384

FOREIGN PATENT DOCUMENTS

JP         2013-172611 A    9/2013

* cited by examiner

*Primary Examiner* — Hoa C Nguyen
*Assistant Examiner* — Amol Patel
(74) *Attorney, Agent, or Firm* — Kenealy Vaidya LLP

(57) ABSTRACT

A wiring structure of a door harness is wired so that the door harness is extended over a vehicle body and a door of a vehicle. A part of the door harness is passed through a first through hole in a door inner panel of the door and a second through hole in the door at a vicinity of the hinge. The door harness includes a door harness body and a grommet. The grommet includes a grommet body disposed in an opening/closing space of the door and a contained portion continuously provided to the grommet body and contained in an internal space of the door inner panel. A first engagement portion and a second engagement portion are provided at both ends of the contained portion. Both of a bending allowing portion and a restoring force generating portion are provided between the first and second engagement portions of the contained portion.

6 Claims, 6 Drawing Sheets

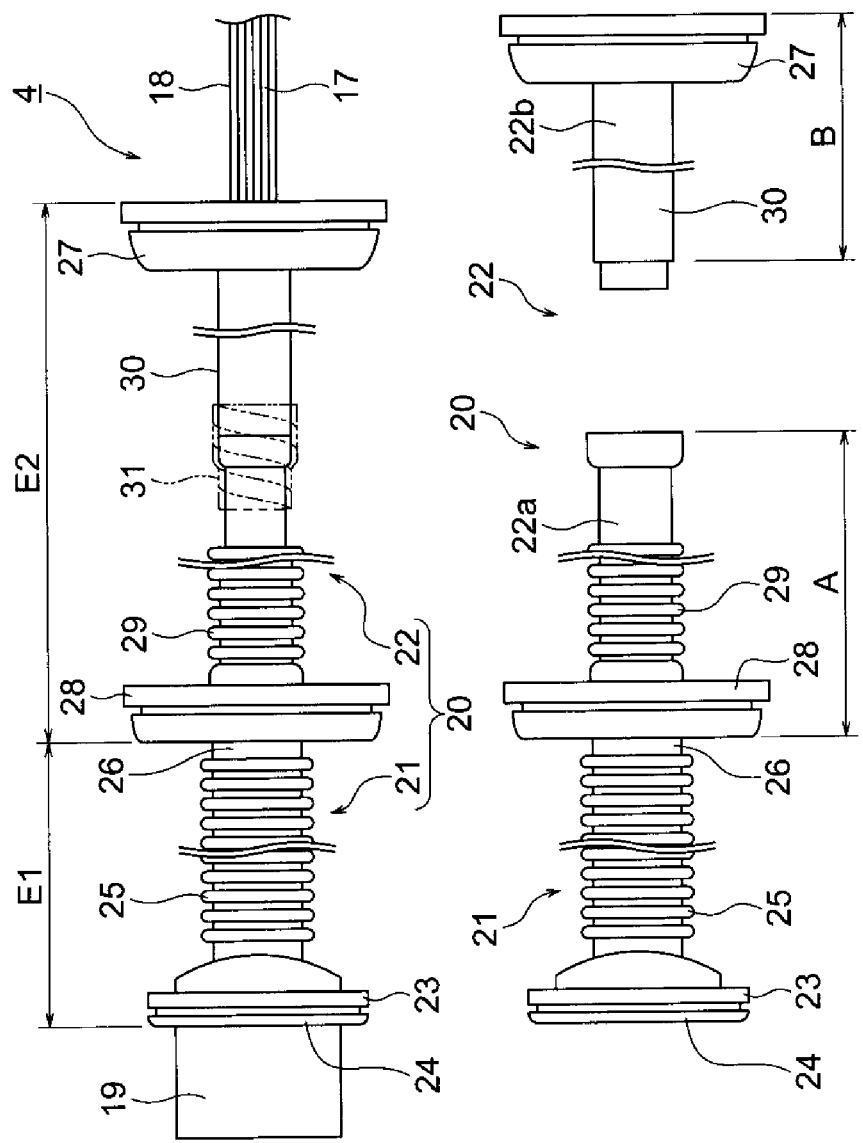

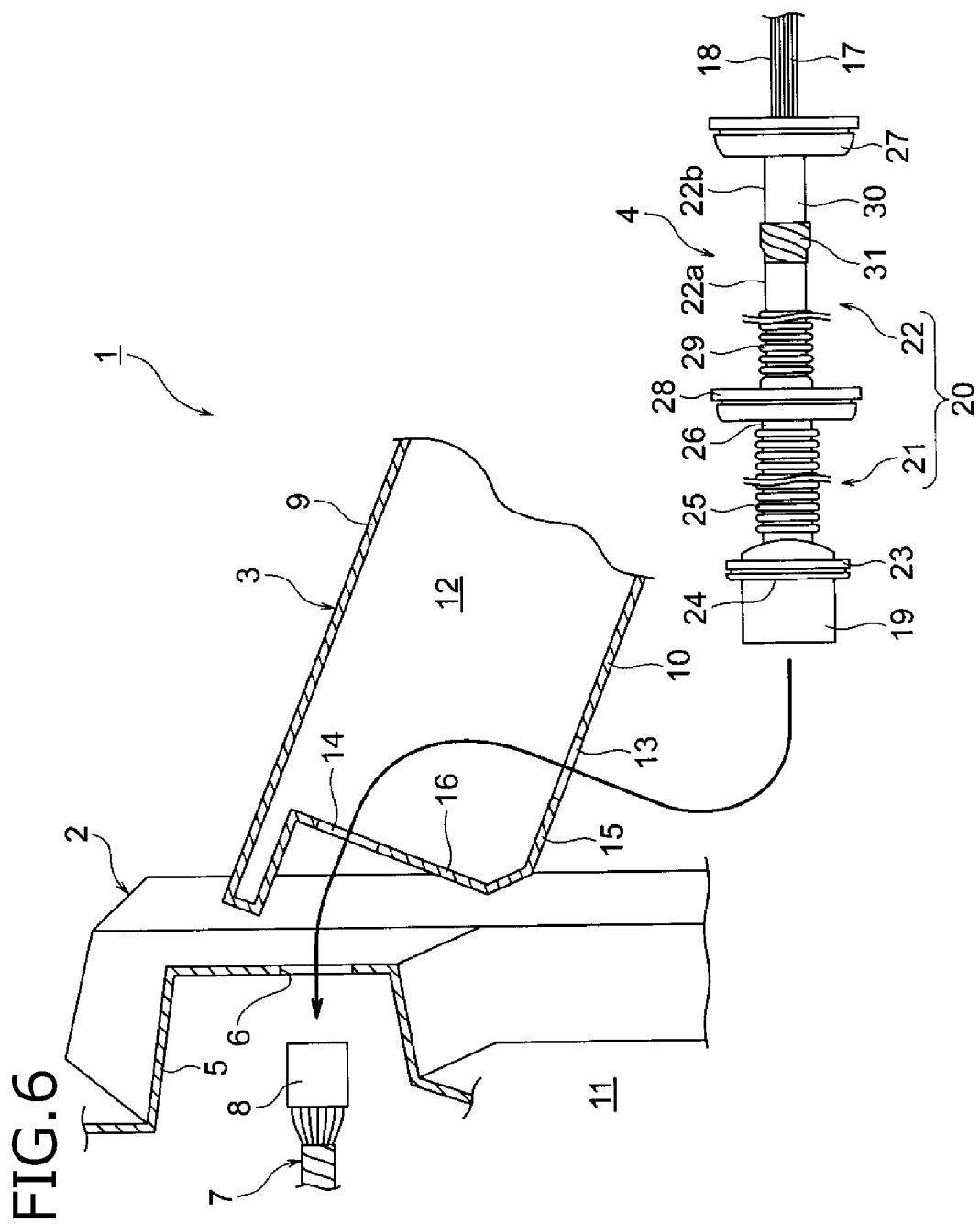

WIRING STRUCTURE OF DOOR HARNESS

CROSS REFERENCE TO RELATED APPLICATIONS

This application is based on Japanese Patent Application (No. 2015-249231) filed on Dec. 22, 2015, the contents of which are incorporated herein by reference.

BACKGROUND OF THE INVENTION

1. Field of the Invention

The present invention relates to a wiring structure of a door harness to be wired on a vehicle body and a door of a vehicle so as to extend over the vehicle body and the door.

2. Description of the Related Art

A door harness is wired on a vehicle body and a door of a vehicle so as to extend over the vehicle body and the door. The door harness includes a door harness body, connectors, and a grommet (for example, see JP-A-2013-172611). The door harness body includes a plurality of electric wires. The connectors are provided at terminals of the door harness body respectively. The grommet is, for example, made of rubber. The door harness body is inserted into the grommet. One terminal of the door harness configured thus is electrically connected to the vehicle body side through a corresponding one of the connectors. The other terminal of the door harness is connected to various accessories through the other connector.

The grommet is disposed in an opening/closing part of the door. The door is attached to the vehicle body through a hinge openably/closably in a rotation direction. One end of the grommet is formed into a shape that can be engaged with a through hole in a wall on the vehicle body side in the state where the door harness body has been inserted into the grommet. In addition, the other end of the grommet is formed into a shape that can be engaged with a through hole in a wall on the hinge side of a door inner panel in the same state. An intermediate part of the grommet is formed into a shape that can expand and contract when the door is opened and closed. The grommet serves as a member for preventing moisture etc. from invading through the through holes.

In the aforementioned configuration and structure, work for wiring the door harness in the opening/closing part of the door is performed as follows. That is, the door harness is first inserted into an opening portion in the door inner panel, that is, an opening portion formed in a wall to which a door trim is attached. The door harness is then passed through an internal space of the door inner panel. After that, the part of the grommet is extracted from the through hole in the wall on the hinge side. Finally, the connector is connected in the position of the through hole in the wall on the vehicle body side.

In the background-art technique, a part of the door harness body extracted from the other end of the grommet is received in the internal space of the door inner panel. Therefore, there is a problem that the received part of the door harness body is affected by moisture invading the internal space of the door inner panel, for example, from a door glass lifted up/down in the door.

In addition, in the background-art technique, when the door harness is installed in the opening/closing part of the door (particularly when the door harness is passed through the internal space of the door inner panel), the door harness body may be twisted, and the door harness body may be affected by the twist. As a result, there is a problem that the door harness body deteriorates in flexibility.

Further, in the background-art technique, the door harness body (electric wires) may hit or rub on an edge of the opening portion or the like of the door inner panel when the harness body is passed through the internal space of the door inner panel. Thus, there is a problem that the door harness body is likely to be damaged.

SUMMARY OF THE INVENTION

The present invention has been developed in consideration of the aforementioned situation. An object of the invention is to provide a wiring structure of a door harness capable of securing waterproofness in the door harness inside a door inner panel, and capable of improving flexibility of the door harness or preventing the door harness from twisting, and further capable of preventing the door harness from being damaged.

In order to solve the problems, a wiring structure of a door harness according to the disclosure is a wiring structure of a door harness to be wired so that the door harness is extend over a vehicle body of a vehicle and a door attached to the vehicle body through a hinge openably/closably in a rotation direction and a part of the door harness is passed through a first through hole in a door inner panel of the door and a second through hole in the door at a vicinity of the hinge, wherein:

the door harness comprises:
a door harness body including a plurality of electric wires; and
a grommet into which the door harness body is inserted;
the grommet comprises:
a grommet body disposed in an opening/closing space of the door where the door is enable to be opened and closed by the hinge; and
a contained portion continuously provided to the grommet body and contained in an internal space of the door inner panel;
a first engagement portion configured to be engaged with the first through hole is provided at one end of the contained portion, a second engagement portion configured to be engaged with the second through hole is provided at the other end of the contained portion, and both of a bending allowing portion and a restoring force generating portion are provided between the first engagement portion and the second engagement portion of the contained portion; and
the bending allowing portion allows the door harness to bend in the internal space and the restoring force generating portion generates a restoring force against a twisting force occurring in the door harness.

According to the above configuration, there is an advantage that it is possible to secure waterproofness in the door harness inside the door inner panel. In addition, according to the configuration of the invention, there is another advantage that it is possible to improve flexibility of the door harness or to prevent the door harness from twisting. Further, according to the configuration of the invention, there is another advantage that it is possible to prevent the door harness from being damaged.

BRIEF DESCRIPTION OF THE DRAWINGS

FIG. 5A is a view showing the configuration and structure of the door harness in FIG. 4, and FIG. 5B is a view showing the configuration and structure of a grommet in FIG. 5A (Embodiment 2).

FIG. 6 is a view showing work for wiring the door harness in FIG. 4 (Embodiment 2).

DETAILED DESCRIPTION OF THE EXEMPLARY EMBODIMENTS

A door harness is wired on a vehicle body and a door of a vehicle so as to extend over the vehicle body and the door. The door harness includes a door harness body and a grommet. The door harness body includes a plurality of electric wires. The grommet is made of rubber or elastomer and is soft and restorable. The door harness body is inserted into the grommet. The grommet includes a grommet body and a contained portion. The grommet body is disposed in an opening/closing part of the door where the door can be opened and closed by the hinge. The contained portion is continuously connected to the grommet body and received in an internal space of a door inner panel. Hole engagement portions that can be engaged with two through holes of the door inner panel are formed at one end and the other end of the contained portion respectively. In addition, a bending allowing portion and a restoring force generating portion are formed in an intermediate part of the contained portion. The bending allowing portion allows the door harness to bend in the internal space of the door inner panel. The restoring force generating portion generates a restoring force against a twisting force occurring in the door harness.

Embodiment 1

Figure 1:
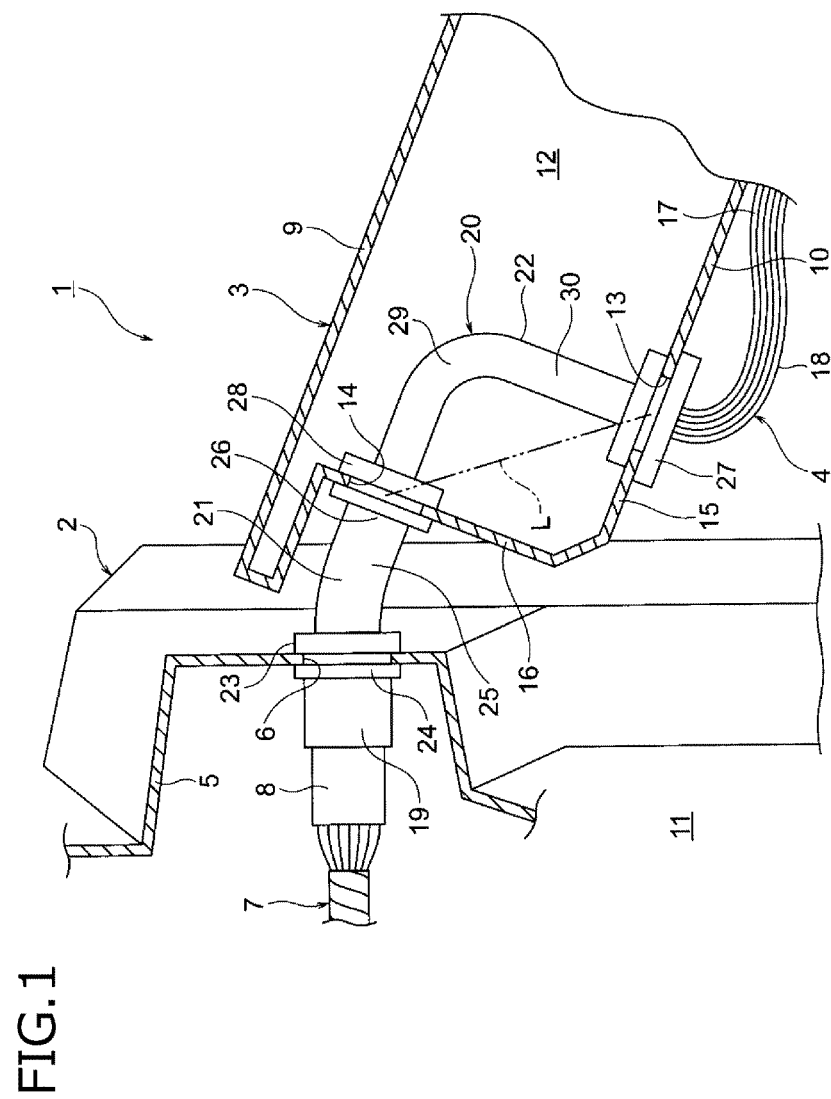
FIG. 1 is a schematic view showing a wiring structure of a door harness according to the invention (Embodiment 1).
Figure 2:
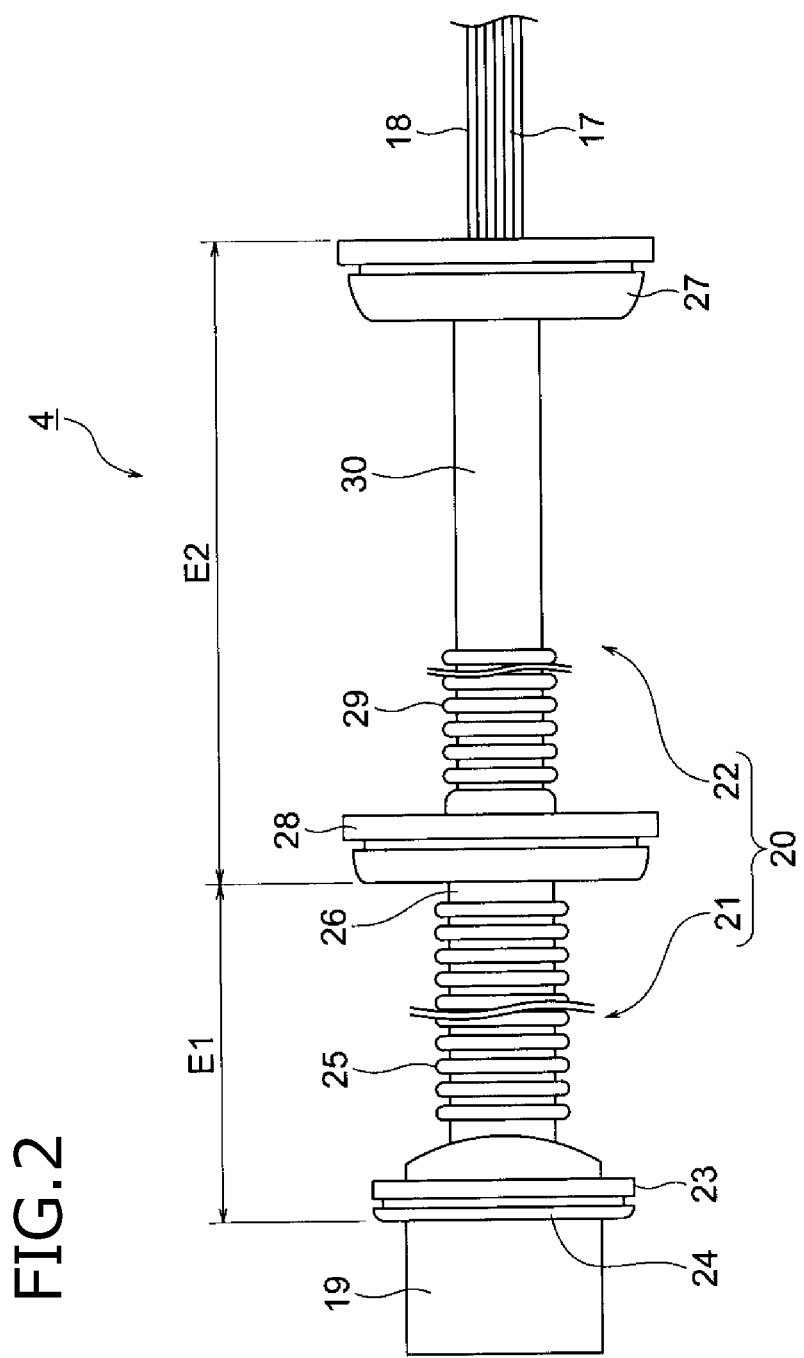
FIG. 2 is a view showing the configuration and structure of the door harness in FIG. 1 (Embodiment 1).
Figure 3:
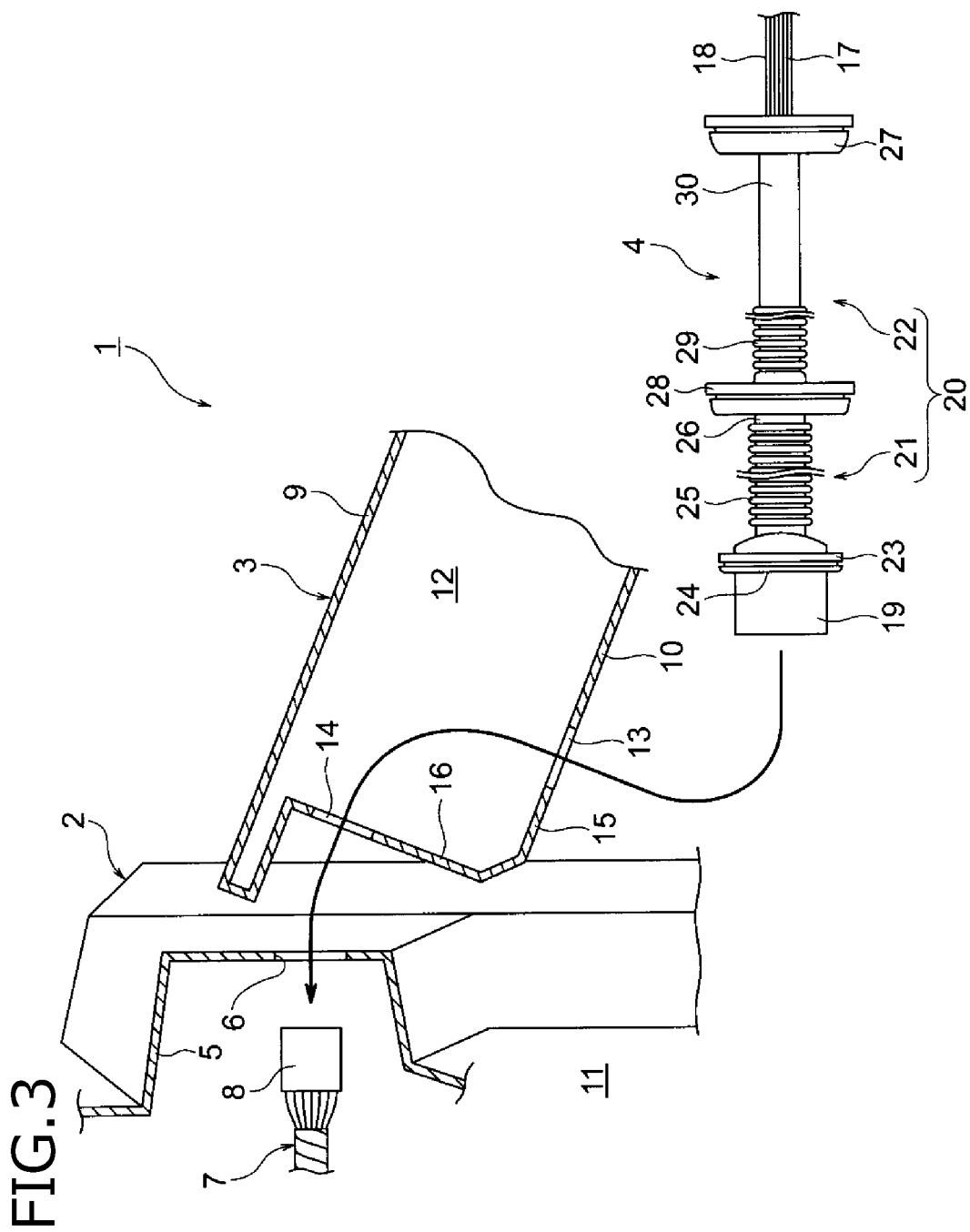
FIG. 3 is a view showing work for wiring the door harness in FIG. 1 (Embodiment 1).

Embodiment 1 will be described below with reference to the drawings. FIG. 1 is a schematic view showing a wiring structure of a door harness according to the invention. FIG. 2 is a view showing the configuration and structure of the door harness in FIG. 1. FIG. 3 is a view showing work for wiring the door harness in FIG. 1.

<About Overall Configuration>

In FIG. 1, a vehicle body 2 and a door 3 are provided in a vehicle 1. The door 3 is attached to the vehicle body 2 through a not-shown hinge openably/closably in a rotation direction. The illustrated door 3 is, for example, a right front side door. The door 3 is depicted in an open state. The reference numeral 4 in FIG. 1 represents a door harness. The door harness 4 is wired on the vehicle body 2 and the door 3 so as to extend over the vehicle body 2 and the door 3. The invention is characterized in a structure for wiring the door harness 4. Assume that the wiring structure is not limited to the aforementioned right front side door but may be also used for a left front side door, rear left and right side doors, etc. (not shown). First, the aforementioned constituent members will be explained.

<About Vehicle Body 2>

In FIG. 1 and FIG. 3, the vehicle body 2 is provided with a body panel 5, which is made of metal and into a predetermined shape. A body through hole 6 that opens, for example, in a circular shape is formed in the body panel 5. A connector 8 provided at a terminal of a vehicle body harness 7 is disposed inside the body panel 5 and near the body through hole 6. The connector 8 is provided for electric connection between the vehicle body harness 7 and the door harness 4.

<About Door 3>

In FIG. 1 and FIG. 3, the door 3 includes a door outer panel 9, a door inner panel 10, a not-shown door trim, and a not-shown door glass. The door outer panel 9 is made of metal and located on the outside. The door inner panel 10 is made of metal in the same manner and disposed inside the door outer panel 9. The door trim is attached to a wall of the door inner panel 10 on the side of a vehicle cabin 11. The door glass is lifted up/down in a position above the door outer panel 9 and the door inner panel 10. In the door 3 configured thus, the reference numeral 12 represents an internal space of the door inner panel 10. A first through hole 13 and a second through hole 14 are formed in the door inner panel 10. The first through hole 13 is formed to circularly penetrate a wall 15 on the not-shown door trim side. On the other hand, the second through hole 14 is formed to circularly penetrate a wall 16 on the not-shown hinge side. The first through hole 13 and the second through hole 14 are formed and disposed in positions comparatively close to each other as illustrated (due to such a layout, there is an advantage that the whole length (total of both of region E1 and region E2 described later) of the grommet 20 in the door harness 4 can be shortened (to contribute to improvement in workability and reduction in cost).

<About Door Harness 4>

In FIG. 1 and FIG. 2, the door harness 4 is wired to extend over the vehicle body 2 and the door 3 as described above. The door harness 4 wired thus is used as a part of a door module (not shown) for operating not-shown accessories on the door 3 side. The door harness 4 includes a door harness body 18, connectors 19, and a grommet 20. The door harness body 18 includes a plurality of electric wires 17. The connectors 19 are provided at terminals of the door harness body 18 respectively. The grommet 20 is made of rubber or elastomer and is soft and restorable. The door harness body 18 is inserted into the grommet 20.

The illustrated one of the connectors 19 is provided for electric connection between the door harness 4 and the vehicle body harness 7. The other not-shown connector is provided for electric connection with the not-shown accessories on the door 3 side.

<About Grommet 20>

In FIG. 1 and FIG. 2, the grommet 20 includes a grommet body 21 and a contained portion 22. The grommet body 21 is disposed in an opening/closing part of the door 3 where the door 3 can be opened and closed by a not-shown hinge. The contained portion 22 is continuously connected to the grommet body 21. In the invention, the part of the region E1 corresponds to the grommet body 21, and the part of the region E2 corresponds to the contained portion 22 (in the invention, description will be made on the assumption that a second engagement portion 28 which will be described later is included in the configuration of the contained portion 22).

<About Grommet Body 21>

In FIG. 2 and FIG. 1, the grommet body 21 is a cylindrical part to be stretched over between the vehicle body 2 and the door 3. A body-side hole engagement portion 23 and a connector holding portion 24 are formed at one end of the grommet body 21. In addition, an extensible and foldable bellows tube portion 25 is formed in an intermediate part of the grommet body 21, and a continuous portion 26 to the contained portion 22 is formed at the other end of the grommet body 21. The body-side hole engagement portion 23 is formed as a part that can be watertightly engaged with an edge portion of the body through hole 6 (see FIG. 1 and FIG. 3) of the body panel 5. On the other hand, the connector holding portion 24 is formed as a part that can hold the connector 19.

<About Contained portion 22>

In FIG. 2 and FIG. 1, the contained portion 22 is a cylindrical part to be received in the internal space 12 of the door inner panel 10. A first engagement portion 27 is formed at one end of the contained portion 22, which is an end portion farther from the grommet body 21. In addition, a second engagement portion 28 is formed at the other end, which is on the continuous side to the grommet body 21. In an intermediate part of the contained portion 22, a bending allowing portion 29 and a restoring force generating portion 30 are formed.

The first engagement portion 27 is formed as a part that can be watertightly engaged with an edge portion of the first through hole 13 of the door inner panel 10. In the same manner, the second engagement portion 28 is formed as a part that can be watertightly engaged with an edge portion of the second through hole 14. The contained portion 22 is formed so that the length between the first engagement portion 27 and the second engagement portion 28 can be made longer than the linear distance between the first through hole 13 and the second through hole 14 (the length of an imaginary line L in FIG. 1) when the contained portion 22 is set straight.

<About Bending Allowing Portion 29>

In FIG. 2 and FIG. 1, the bending allowing portion 29 is formed as a part that can allow the door harness 4 to bend inside the internal space 12 of the door inner panel 10. In the embodiment, the bending allowing portion 29 is formed into a shape like a bellows tube extensible and bendable on the second engagement portion 28 side (assume that the shape like a bellows tube is an example, and it is not limited to any special shape as long as it is soft enough to be bent).

<About Restoring Force Generating Portion 30>

In FIG. 2 and FIG. 1, the restoring force generating portion 30 is formed as a part that can generate a restoring force against a twisting force occurring in the door harness 4 (the door harness body 18). In the embodiment, the restoring force generating portion 30 is formed and disposed between the bending allowing portion 29 and the first engagement portion 27. In addition, in the embodiment, the restoring force generating portion 30 is also formed as a part that can allow bending in the same manner as the bending allowing portion 29.

The restoring force generating portion 30 is formed so that the inner diameter of the whole or a part of the restoring force generating portion 30 can be made a little smaller than the outer diameter of the door harness body 18 (not shown). To say other words, the restoring force generating portion 30 is formed to include a part that can press (come in tight contact with) the external surface of the door harness body 18 inward. If the restoring force generating portion 30 is in tight contact with the door harness body 18 when a twisting force occurs in the door harness body 18, it will be difficult to generate a restoring force. It is also effective in this Embodiment 1 to use a shape of the restoring force generating portion 30 having a different outer diameter as shown in FIG. 5 of Embodiment 2, which will be described later.

Incidentally, the whole intermediate part of the contained portion 22 may be formed as the bending allowing portion 29 and the restoring force generating portion 30. In this case, the whole intermediate part of the contained portion 22 serves as a part that can allow bending and generate a restoring force.

<About Wiring Work and Wiring Structure of Door Harness 4>

Next, the wiring work and the wiring structure of the door harness 4 in the opening/closing part of the door 3 will be described based on the aforementioned configuration and structure.

The wiring work of the door harness 4 is performed and completed in a direction shown by the arrow in FIG. 3. Specific description will be made with reference to FIG. 3 and FIG. 1. The wiring work in the opening/closing part of the door 3 is completed and the wiring structure is finished in a sequence of steps of: (1) inserting the door harness 4 into the first through hole 13 of the door inner panel 10 from the grommet body 21 side with the connector 19 in front; (2) putting the door harness 4 through the internal space 12 of the door inner panel 10 and then extracting the door harness 4 from the second through hole 14; (3) connecting the connector 19 to the connector 8 of the vehicle body harness 7; (4) watertightly engaging the body-side hole engagement portion 23 of the grommet body 21 with the edge portion of the body through hole 6 of the body panel 5; (5) watertightly engaging the second engagement portion 28 of the contained portion 22 passing through the internal space 12 of the door inner panel 10 with the edge portion of the second through hole 14 of the door inner panel 10; and finally (6) watertightly engaging the first engagement portion 27 of the contained portion 22 with the edge portion of the first through hole 13 of the door inner panel 10.

Effects of the Invention

According to the invention, as has been described above with reference to FIG. 1 to FIG. 3, the door harness 4 is wired in a state where the part to be received in the internal space 12 of the door inner panel 10 and the opening/closing part of the door 3 have been covered with the grommet 20. Therefore, according to the wiring structure of the door harness 4 according to the invention, there is an effect that it is possible to secure waterproofness in the door harness 4 (the door harness body 18) inside the door inner panel 10.

In addition, in the part to be received in the internal space 12 of the door inner panel 10, the door harness 4 can be bent flexibly in spite of the state where the door harness body 18 has been covered with the contained portion 22 of the grommet 20, while a restoring force against a twisting force occurring in the door harness 4 during the wiring work can be generated in the grommet 20. Therefore, according to the wiring structure of the door harness 4 according to the invention, there is another effect that the door harness 4 can be improved in flexibility or prevented from twisting.

Further, the grommet 20 is engaged with the opening parts (the first through hole 13 and the second through hole 14) of the door inner panel 10, and the whole part to be received in the internal space 12 of the door inner panel 10 is covered with the contained portion 22 of the grommet 20. Accordingly, there is no fear that the door harness body 18 itself may hit or rub on the edge (the edge portion of the first through hole 13 etc.) of the door inner panel 10. Therefore, according to the wiring structure of the door harness 4 according to the invention, there is another effect that it is possible to prevent the door harness 4 from being damaged.

Incidentally, although the invention (the scope of claims) is characterized as the wiring structure of the door harness 4, this may be rewritten as the invention of the door harness 4 itself characterized as follows.

That is, the door harness 4 is characterized by "a door harness 4 to be wired so that the door harness 4 can extend over a vehicle body 2 of a vehicle 1 and a door 3 attached to the vehicle body 2 through a hinge openably/closably in a rotation direction and a part of the door harness 4 can be inserted between a first through hole 13 on a side of a door trim opened to a door inner panel 10 of the door 3 and a second through hole 14 on a side of the hinge, wherein:

the door harness 4 includes a door harness body 18 and a grommet 20, the door harness body 18 including a plurality of electric wires 17, the grommet 20 being made of rubber or elastomer and being soft and restorable, the door harness body 18 being inserted into the grommet 20;

the grommet 20 includes a grommet body 21 and a contained portion 22, the grommet body 21 being disposed in an opening/closing part of the door 3 where the door 3 can be opened and closed by the hinge, the contained portion 22 being continuously connected to the grommet body 21 and received in an internal space 12 of the door inner panel 10; and a first engagement portion 27 that can be engaged with the first through hole 13 is formed at one end of the contained portion 22 while a second engagement portion 28 that can be engaged with the second through hole 14 is formed at the other end of the contained portion 22, and a bending allowing portion 29 and a restoring force generating portion 30 are formed in an intermediate part of the contained portion 22, the bending allowing portion 29 allowing the door harness 4 to bend in the internal space 12, the restoring force generating portion 30 generating a restoring force against a twisting force occurring in the door harness 4.

In addition, the wiring structure of the door harness 4 may be replaced by a twisting prevention structure to characterize the invention.

Embodiment 2

Figure 4:
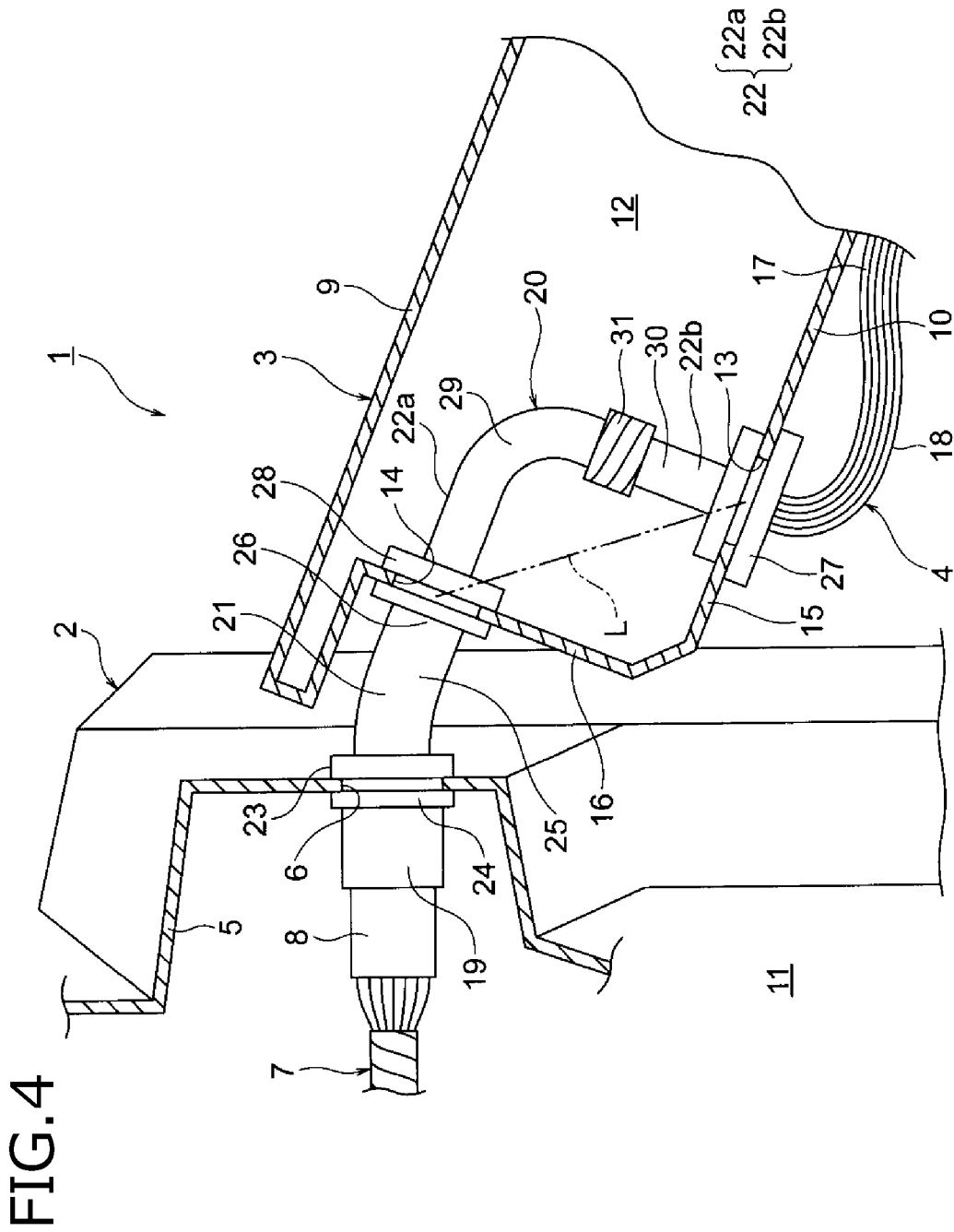
FIG. 4 is a schematic view showing a wiring structure of a door harness according to the invention (Embodiment 2).

Embodiment 2 will be described below with reference to the drawings. FIG. 4 is a schematic view showing a wiring structure of a door harness according to the invention. FIG. 5A is a view showing the configuration and structure of the door harness in FIG. 4, and FIG. 5B is a view showing the configuration and structure of a grommet in FIG. 5A. FIG. 6 is a view showing work for wiring the door harness in FIG. 4. Incidentally, constituent members fundamentally the same as those in the Embodiment 1 are referenced correspondingly, and detailed description thereof will be omitted.
<About Difference Between Embodiment 2 and Embodiment 1>

In FIG. 4 to FIG. 6, Embodiment 2 is different from Embodiment 1 at a point that the contained portion 22 of the grommet 20 is formed into a shape divided into two parts. Accordingly, only the difference will be explained here for the sake of simplification.
<About Grommet 20>

In FIG. 4 and FIG. 5, the grommet 20 includes a grommet body 21 and a contained portion 22. A first engagement portion 27 is formed at one end of the contained portion 22, while a second engagement portion 28 is formed at the other end. In addition, a bending allowing portion 29 and a restoring force generating portion 30 are formed in an intermediate part of the contained portion 22.

The contained portion 22 according to Embodiment 2 is formed into a shape that is divided into two parts in a position corresponding to a predetermined length (measurement A in FIG. 5B) from the second engagement portion 28. On the assumption that the side continuously connected to the grommet body 21 is a contained portion body 22a, the side designated by the reference sign 22b is used as a replaceable body. A plurality of kinds of pieces different in measurement B in FIG. 5B are prepared as the replaceable bodys 22b. Thus, there is an advantage that even when the distance of the wiring path between the first through hole 13 and the second through hole 14 in the door inner panel changes, for example, in accordance with the type of the vehicle, the change can be dealt with without replacing the grommet 20 as a whole.

The two divided parts are superposed on each other and formed into tight contact with each other. In addition, taping 31 is applied to the parts so that the parts can be formed in a fixed state where the parts cannot rotate or move axially relatively to each other. Incidentally, where to integrate the parts with each other is set in consideration of positions where the grommet 20 should be bent or a restoring force should be generated.
<About Wiring Work and Wiring Structure of Door Harness 4>

The wiring work and the wiring structure of the door harness 4 according to Embodiment 2 are similar to the wiring work and the wiring structure according to Embodiment 1. The wiring structure is completed by the wiring work performed in a direction as shown by the arrow in FIG. 6 (detailed description is omitted).
<About Effects of the Invention>

According to the wiring structure according to the invention in Embodiment 2, as has been described above with reference to FIG. 4 to FIG. 6, there is an effect that it is possible to secure waterproofness in the door harness body inside the door inner panel, in the same manner as in Embodiment 1. In addition, there is another effect that it is possible to improve flexibility of the door harness 4 or prevent the door harness 4 from twisting. Further, there is another effect that it is possible to prevent the door harness 4 from being damaged.

It can be noted as an effect proper to Embodiment 2 that the length of a part to be received in the internal space 12 of the door inner panel 10 can be changed by a simple structure.

In addition, not to say, various changes can be made on the invention without changing the gist of the invention.

Here, the details of the above embodiments are summarized as follows.

There is provided a wiring structure of a door harness to be wired so that the door harness is extend over a vehicle body of a vehicle and a door attached to the vehicle body through a hinge openably/closably in a rotation direction and a part of the door harness is passed through a first through hole in a door inner panel of the door and a second through hole in the door at a vicinity of the hinge, wherein: the door harness comprises: a door harness body including a plurality of electric wires; and a grommet into which the door harness body is inserted; the grommet comprises: a grommet body disposed in an opening/closing space of the door where the door is enable to be opened and closed by the hinge; and a contained portion continuously provided to the grommet body and contained in an internal space of the door inner panel; a first engagement portion configured to be engaged with the first through hole is provided at one end of the contained portion, a second engagement portion configured to be engaged with the second through hole is provided at the other end of the contained portion, and both of a bending allowing portion and a restoring force generating portion are provided between the first engagement portion and the second engagement portion of the contained portion; and the bending allowing portion allows the door harness to bend in the internal space and the restoring force generating portion generates a restoring force against a twisting force occurring in the door harness.

According to the above configuration, the door harness is wired in the state where the part received in the internal space of the door inner panel and the opening/closing part of the door have been covered with the grommet. Although the part received in the internal space of the door inner panel is covered with the grommet, the door harness can be bent flexibly in that part, and the restoring force against the twisting force occurring in the door harness during the wiring work can be generated by the grommet. In the door harness, the grommet is engaged with the two through holes of the door inner panel. In addition, the whole part received in the internal space of the door inner panel is covered with the grommet. Therefore, there is no fear that the door harness body itself may hit or rub, for example, on an edge of the door inner panel.

Also, there is an advantage that it is possible to secure waterproofness in the door harness inside the door inner panel. In addition, according to the configuration of the invention, there is another advantage that it is possible to improve flexibility of the door harness or to prevent the door harness from twisting. Further, according to the configuration of the invention, there is another advantage that it is possible to prevent the door harness from being damaged.

For example, the contained portion is configured by a contained portion body and a replaceable body as two divided parts, the contained portion is provided with the second engagement portion and the replaceable body is provided with the first engagement portion.

According to the above configuration, of the two divided parts, as the part where the first engagement portion is located, a plurality of kinds of parts may be prepared in order to deal with a change in length of a wiring path between the first through hole and the second through hole without replacing the grommet as a whole even if the length of the wiring path is changed, for example, in accordance with a difference in vehicle type.

Also, there is an advantage that it is possible to easily change the length of the part to be received in the internal space of the door inner panel.

For example, a connection portion where one end of the contained portion body is superposed to one end of the replaceable body is integrated by a tape winding around the connection portion.

According to the above configuration, the two divided parts are superposed on each other so that the parts can be formed in tight contact with each other. In addition, the two parts are taped so that the parts can be formed fixedly to be prevented from rotating or moving axially relatively to each other. Incidentally, not to say, with due consideration given to the layout of the integrated parts, there is no problem in bending the door harness or generating the restoring force.

Also, the two divided parts can be integrated with a simple structure so that the parts cannot rotate or move axially relatively to each other.

For example, the grommet is made of rubber or elastomer and has soft and restorable.

For example, the grommet body is disposed between the vehicle body and the door.

For example, the contained portion of the grommet covers whole circumference of the door harness body passed through both of the first through hole and the second through hole and disposed in the internal space of the door inner panel.

What is claimed is:

1. A wiring structure of a door harness to be wired so that the door harness is extend over a vehicle body of a vehicle and a door attached to the vehicle body through a hinge openably/closably in a rotation direction and a part of the door harness is passed through a first through hole in a door inner panel of the door and a second through hole in the door at a vicinity of the hinge, wherein:

the door harness comprises:
  a door harness body including a plurality of electric wires; and
  a grommet into which the door harness body is inserted;

the grommet comprises:
  a grommet body disposed in an opening/closing space of the door where the door is enabled to be opened and closed by the hinge; and
  a contained portion continuously provided to the grommet body and contained in an internal space of the door inner panel;

a first engagement portion configured to be engaged with the first through hole is provided at one end of the contained portion, a second engagement portion configured to be engaged with the second through hole is provided at the other end of the contained portion, and both of a bending allowing portion and a restoring force generating portion are provided between the first engagement portion and the second engagement portion of the contained portion;

the bending allowing portion allows the door harness to bend in the internal space and the restoring force generating portion generates a restoring force against a twisting force occurring in the door harness; and the restoring force generating portion has an inner diameter that is less than an outer diameter of the door harness body such that the restoring force generating portions is in tight contact with the door harness body.

2. The wiring structure of the door harness according to claim 1, wherein the contained portion is configured by a contained portion body and a replaceable body as two divided parts, the contained portion is provided with the second engagement portion and the replaceable body is provided with the first engagement portion.

3. The wiring structure of the door harness according to claim 2, wherein a connection portion where one end of the contained portion body is superposed to one end of the replaceable body is integrated by a tape winding around the connection portion.

4. The wiring structure of the door harness according to claim 1, wherein the grommet is made of rubber or elastomer and is soft and restorable.

5. The wiring structure of the door harness according to claim 1, wherein the grommet body is disposed between the vehicle body and the door.

6. The wiring structure of the door harness according to claim 1, wherein the contained portion of the grommet covers whole circumference of the door harness body passed through both of the first through hole and the second through hole and disposed in the internal space of the door inner panel.

* * * * *